US011422003B2

(12) United States Patent
Hashimoto et al.

(10) Patent No.: US 11,422,003 B2
(45) Date of Patent: Aug. 23, 2022

(54) CONTROL DEVICE AND MAP GENERATION METHOD (71) Applicant: PANASONIC INTELLECTUAL PROPERTY MANAGEMENT CO., LTD., Osaka (JP)

(72) Inventors: Kazuaki Hashimoto, Osaka (JP); Jin Yoshizawa, Osaka (JP); Takashi Uchida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/959,335

(22) PCT Filed: Feb. 22, 2019

(86) PCT No.: PCT/JP2019/006828
§ 371 (c)(1),
(2) Date: Jun. 30, 2020

(87) PCT Pub. No.: WO2019/187855
PCT Pub. Date: Oct. 3, 2019

(65) Prior Publication Data
US 2020/0355517 A1    Nov. 12, 2020

(30) Foreign Application Priority Data

Mar. 29, 2018 (JP) .............................. JP2018-066042

(51) Int. Cl.
*G01C 21/00* (2006.01)
*G08G 1/01* (2006.01)
*G08G 1/09* (2006.01)

(52) U.S. Cl.
CPC ..... *G01C 21/3837* (2020.08); *G01C 21/3848* (2020.08); *G08G 1/01* (2013.01); *G08G 1/0112* (2013.01); *G08G 1/09* (2013.01)

(58) Field of Classification Search
CPC ........... G01C 21/3837; G01C 21/3848; G08G 1/0112; G08G 1/01; G08G 1/09
See application file for complete search history.

(56) References Cited

U.S. PATENT DOCUMENTS 10,520,319 B2 * 12/2019 Zhu ..................... G08G 1/0129
2014/0025292 A1 * 1/2014 Stahlin ................ G08G 1/0112
701/461

(Continued)

FOREIGN PATENT DOCUMENTS

CN    101278325 A    10/2008
CN    103903463 A    7/2014

(Continued)

OTHER PUBLICATIONS

Japanese Office Action dated May 11, 2021 issued in corresponding Japanese Patent Application No. 2020-510450; with English translation.

(Continued)

*Primary Examiner* — Dale W Hilgendorf
(74) *Attorney, Agent, or Firm* — McDermott Will & Emery LLP (57) ABSTRACT A control device includes: an obtaining unit configured to obtain location information of an electric bicycle and operation information obtained by the vehicle; a calculation unit configured to generate environment information indicating an estimated travel environment of the electric bicycle based on the operation information; and a storage unit configured to store the location information and the environment information. The calculation unit is configured to generate an updated map by associating the location information with (Continued)

the environment information, and reflecting the location information and the environment information on a map.

4 Claims, 4 Drawing Sheets

(56) References Cited

U.S. PATENT DOCUMENTS

| | | | |
|---|---|---|---|
| 2014/0136099 A1* | 5/2014 | Choi | G06F 16/29 701/453 |
| 2016/0049075 A1* | 2/2016 | Sato | G01C 21/3461 340/905 |
| 2016/0078757 A1* | 3/2016 | Inaba | G08G 1/0112 701/119 |
| 2016/0082978 A1 | 3/2016 | Ozaki et al. | |
| 2017/0241778 A1 | 8/2017 | Hanatsuka et al. | |
| 2018/0045832 A1* | 2/2018 | Ibrahim | G08G 1/167 |
| 2018/0286220 A1* | 10/2018 | Fowe | G08G 1/0141 |
| 2019/0003839 A1* | 1/2019 | Hu | B60W 40/072 |
| 2019/0078896 A1* | 3/2019 | Zhu | G08G 1/20 |
| 2019/0266890 A1* | 8/2019 | Lei | G08G 1/096716 |
| 2020/0234459 A1* | 7/2020 | Naikal | G06T 7/74 |
| 2021/0172760 A1* | 6/2021 | Suzuki | G01C 21/3848 |
| 2021/0180959 A1* | 6/2021 | Muto | G08G 1/0112 |

FOREIGN PATENT DOCUMENTS

| | | | |
|---|---|---|---|
| CN | 107369320 A | * | 11/2017 |
| CN | 107369320 A | | 11/2017 |
| EP | 2573594 A1 | | 3/2013 |
| JP | H07-334786 A | | 12/1995 |
| JP | 2006-113836 A | | 4/2006 |
| JP | 2012-073181 A | | 4/2012 |
| JP | 2013-257243 A | | 12/2013 |
| JP | 2014-211756 A | | 11/2014 |
| JP | 2016-080451 A | | 5/2016 |
| WO | 2004/092876 A2 | | 10/2004 |

OTHER PUBLICATIONS

Extended European Search Report dated Apr. 1, 2021, issued in counterpart European Patent Application No. 19774333.9.
International Search Report and Written Opinion dated Mar. 26, 2019 in International Application No. PCT/JP2019/006828; with partial English translation.
Chinese Office Action issued Chinese Patent Application No. 201980007495.1, dated Jul. 1, 2021; with English translation of the search report.
Chinese Office Action with Search Report dated Mar. 31, 2022 issued in the corresponding Chinese Patent Application No. 201980007495 1, with English translation.

* cited by examiner

|  | OPERATION INFORMATION | LOCATION INFORMATION | TIME INFORMATION |
|---|---|---|---|
| DATA 1 | SPEED INFORMATION | (x1, y1, z1) | t1 |
| DATA 2 | VIBRATION INFORMATION | (x2, y2, z2) | t2 |
| ⋮ | ⋮ | ⋮ | ⋮ |

FIG. 3B

|  | ENVIRONMENT INFORMATION | LOCATION INFORMATION | TIME INFORMATION |
|---|---|---|---|
| DATA 1 | CONGESTED WITH PEOPLE | (x1, y1, z1) | t1 |
| DATA 2 | UNEVEN ROAD SURFACE | (x2, y2, z2) | t2 |
| ⋮ | ⋮ | ⋮ | ⋮ |

FIG. 4

CONTROL DEVICE AND MAP GENERATION METHOD

CROSS-REFERENCE OF RELATED APPLICATIONS

This application is the U.S. National Phase under 35 U.S.C. § 371 of International Patent Application No. PCT/JP2019/006828, filed on Feb. 22, 2019, which in turn claims the benefit of Japanese Application No. 2018-066042, filed on Mar. 29, 2018, the entire disclosures of which Applications are incorporated by reference herein.

TECHNICAL FIELD

The present disclosure relates to a control device and a map generation method.

BACKGROUND ART

A map creation system that includes: a digital map database that stores a digital map; a position information acquisition means that outputs information on a position where a vehicle driven by a user has traveled as position information data at every predetermined timing; and a position information acquisition means that creates a path through which the vehicle has actually traveled on the basis of the pieces of position information data, divides the path into road sections on the basis of a predetermined condition, and store an evaluation result obtained from the user as road evaluation information (for example, see Patent Literature (PTL) 1).

CITATION LIST

Patent Literature

PTL 1: Japanese Unexamined Patent Application Publication No. 2013-257243

SUMMARY OF THE INVENTION

Technical Problem

In the conventional technique, a map is generated based on the evaluation result of the user. Thus, generating a map requires a great deal of work and the information to be inputted to the map would be limited, because the map is based on the user's evaluation result.

In view of the above, the present disclosure has an object to provide a control device capable of generating a map on which information is accurately reflected and a map generation method for generating such a map.

Solution to Problem

In order to achieve the above-described object, a control device according to one aspect of the present disclosure includes: an obtaining unit configured to obtain location information of a vehicle and operation information obtained by the vehicle; a calculation unit configured to generate environment information indicating an estimated travel environment of the vehicle based on the operation information; and a storage unit configured to store the location information and the environment information. The calculation unit is configured to generate an updated map by associating the location information with the environment information, and reflecting the location information and the environment information on a map.

Moreover, a map generation method according to one aspect of the present disclosure includes: obtaining location information of a vehicle and operation information obtained by the vehicle; generating environment information indicating an estimated travel environment of the vehicle based on the operation information; and storing the location information and the environment information; and generating an updated map by associating the location information with the environment information, and reflecting the location information and the environment information on a map.

Advantageous Effect of Invention

The control device and the map generation method according to one aspect of the present disclosure enables generation of a map on which information is accurately reflected.

DESCRIPTION OF EXEMPLARY EMBODIMENT

An embodiment according to the present disclosure is described in detail below, with reference to drawings. Note that the following embodiment shows a general or specific example. Therefore, numerical values, shapes, materials, structural elements, the arrangement and connection of the structural elements, steps, the processing order of the steps, etc. shown in the following embodiment are mere examples, and are not intended to limit the scope of the present disclosure. Thus, among the structural elements in the following embodiment, structural elements not recited in any one of the independent claims representing the broadest concepts are described as optional structural elements.

Furthermore, the figures are schematic diagrams and are not necessarily precise illustrations. Accordingly, the figures are not necessarily to scale, for example. Moreover, throughout the figures, structural elements that are essentially the same share like reference signs. Accordingly, duplicate description is omitted or simplified.

First, a control device and a map generation method according to the present embodiment will be described.

Embodiment

Configuration

Figure 1:
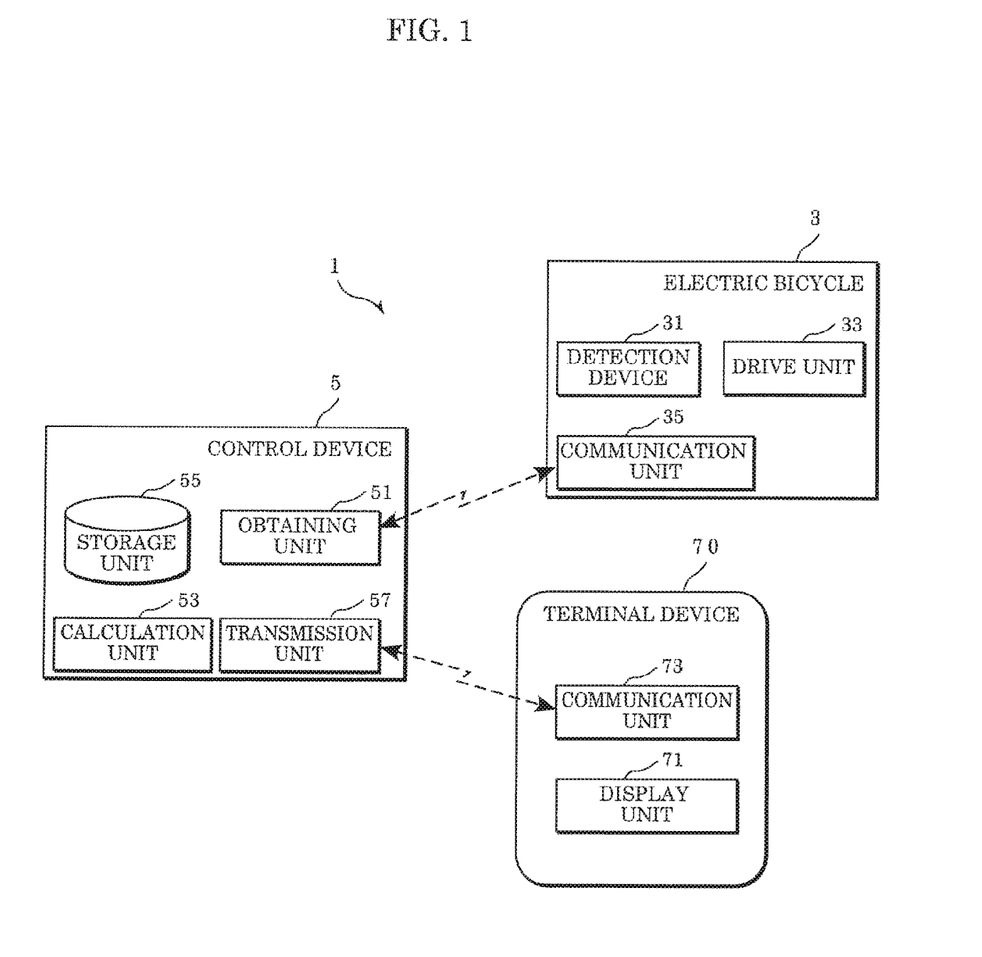
FIG. 1 is a block diagram illustrating a map generation system according to an embodiment.

FIG. 1 is a block diagram illustrating map generation system 1 according to the embodiment.

As illustrated in FIG. 1, map generation system 1 is capable of providing a map to terminal device 70. Map generation system 1 includes a vehicle and control device 5.

A vehicle can travel on a road freely by being operated by a user. Examples of a vehicle include an automobile having a power source, a wheeled vehicle such as a motorcycle, electric bicycle 3 that is power assisted, and a wheeled vehicle without a power source, such as a bicycle. In the present embodiment, electric bicycle 3 is used as a vehicle.

Figure 2:
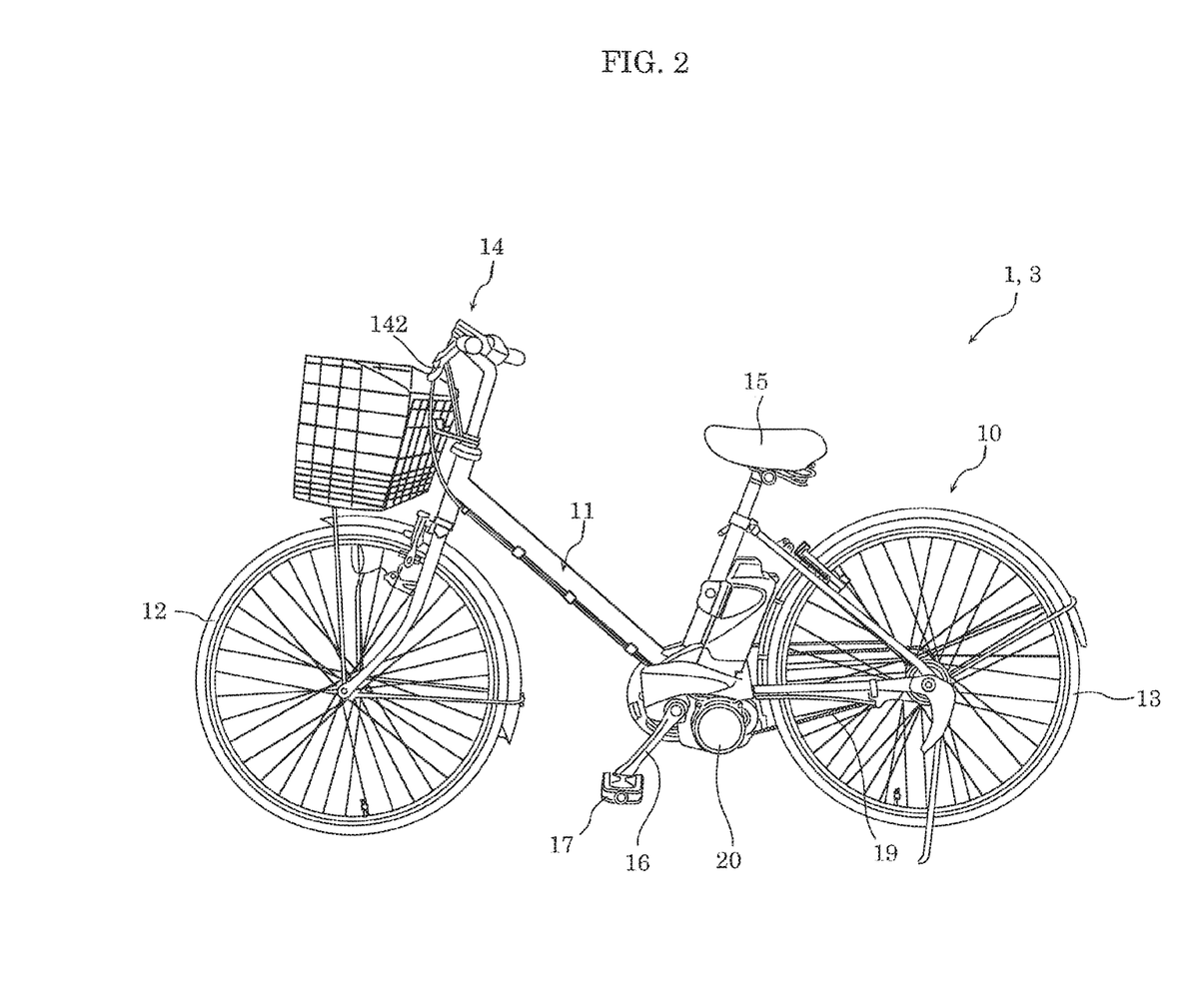
FIG. 2 is a side view illustrating a configuration of an electric bicycle.

The configuration of electric bicycle 3 will be described. FIG. 2 is a side view illustrating the configuration of electric bicycle 3.

Electric bicycle 3 illustrated in FIG. 2 assists forward travel of body 10 resulting from pedal force applied to pedals 17 by a user or power applied to body 10 when body 10 is pushed forward by the user when the user pushes electric bicycle 3 while the user walks.

Electric bicycle 3 includes body 10, detection device 31, drive unit 33, and communication unit 35.

Body 10 includes frame 11, front wheel 12, rear wheel 13, handlebars 14, saddle 15, cranks 16, pedals 17, and chain 19.

Frame 11 rotatably supports front wheel 12 about the axle of front wheel 12, and rotatably supports rear wheel 13 about the axle of rear wheel 13.

Handlebars 14 have a pair of brake levers 142 provided on the left and right. Handlebars 14 can turn front wheel 12 supported by frame 11 to the left or right by being turned to the left or right. Operating one of brake levers 142 applies mechanical braking force to front wheel 12, and operating the other brake lever 142 applies mechanical braking force to rear wheel 13. Brake levers 142 each may have a brake sensor. In such a case, the brake sensor detects an operation performed on brake lever 142.

Saddle 15 is a portion where a user sits on when the user rides on electric bicycle 3 in an appropriate posture. Saddle 15 is supported by a middle portion of frame 11 such that saddle 15 can be attached to or detached from frame 11.

Cranks 16 rotate about a crank shaft when pedal force is applied to pedals 17, and human power driving force in accordance with the pedal force is transferred to rear wheel 13 via a sprocket and chain 19.

Drive unit 33 is a device that adds auxiliary driving force to the human power driving force resulting from the pedal force applied to pedals 17, by receiving electric power from a battery. Drive unit 33 is implemented using a battery, an electric motor, and a control device that performs drive control of the electric motor.

Detection device 31 can detect operations of electric bicycle 3. Examples of operations of electric bicycle 3 include acceleration of electric bicycle 3, operations of the brakes, a steering angle of the handlebars, speed of electric bicycle 3, vibration that occurs during travel of electric bicycle 3, angular velocity of electric bicycle 3 with respect to a horizontal plane, motor torque, geomagnetism, and a current location.

Examples of detection device 31 include sensors such as an acceleration sensor, a brake sensor, a steering angle sensor, a speed sensor, a vibration sensor, an angular velocity sensor, a distance sensor, a torque sensor, a geomagnetic sensor, and a global positioning system (GPS) device. Detection device 31 includes at least one of those sensors, and is provided to electric bicycle 3.

The acceleration sensor which is an example of detection device 31 may be a sensor that detects acceleration of electric bicycle 3. The acceleration sensor detects acceleration information indicating acceleration when travel speed of electric bicycle 3 increases, and transmits the acceleration information to control device 5 via communication unit 35. The acceleration information is an example of the operation information.

Moreover, the brake sensor which is an example of detection device 31 may be a sensor that detects an operation performed on a brake lever. The brake sensor transmits braking information indicating an operation performed on a brake lever to control device 5 via communication unit 35 when a user operates a brake. The braking information is an example of the operation information.

Moreover, the steering angle sensor which is an example of detection device 31 may be a sensor that detects a steering angle of the handlebars of electric bicycle 3. The steering angle sensor transmits steering angle information to control device 5 via communication unit 35 when a user operates the handlebars. The steering angle information indicates an angle (steering angle) with respect to the direction of forward travel of electric bicycle 3. The steering angle information is an example of the operation information.

Moreover, the speed sensor may be a sensor that detects travel speed of electric bicycle 3. The speed sensor transmits speed information indicating travel speed of electric bicycle 3 to control device 5 via communication unit 35, when the user moves electric bicycle 3 forward using the user's pedal force. The speed information is an example of the operation information.

Note that the speed sensor may detect the travel speed of electric bicycle 3 based on the number of revolutions of front wheel 12 or rear wheel 13. The speed sensor is not limited to the above sensor, and may be a torque sensor that detects human power driving force generated by the crank shaft rotating in accordance with human power driving force applied to pedals 17. The travel speed of electric bicycle 3 may be calculated, based on the number of revolutions of cranks 16 detected by at least one crank revolution sensor that detects the number of revolutions of the crank shaft and based on the size of rear wheel 13. In this case, the speed sensor is disposed near the crank shaft.

Moreover, the vibration sensor may be a sensor that detects vibration that occurs during travel of electric bicycle 3. The vibration sensor transmits vibration information indicating vibration that has occurred during travel of electric bicycle 3 to control device 5 via communication unit 35. The vibration information is an example of the operation information. Note that vibration naturally occurs when electric bicycle 3 travels, and thus vibration less than or equal to a predetermined threshold does not necessarily need to be detected. In this case, this may be implemented using a high-pass filter, for example.

Moreover, the angular velocity sensor may be a sensor that detects angular velocity of electric bicycle 3 with respect to a horizontal plane. The angular velocity sensor transmits angular velocity information indicating angular velocity of electric bicycle 3 to control device 5 via communication unit 35. The angular velocity information is an example of the operation information. Calculation unit 53 can, for example, determine whether electric bicycle 3 is traveling an upslope or downslope and calculate a tilt of electric bicycle 3, based on the angular velocity of electric bicycle 3. A tilt of electric bicycle 3 is represented by an angle of a straight line connecting the axle of front wheel 12 and the axle of rear wheel 13 with respect to the horizontal plane, when the diameters of front wheel 12 and rear wheel 13 are the same.

Moreover, the distance sensor may be a sensor that detects distance from electric bicycle 3 to an object. The distance sensor transmits, to control device 5 via communication unit 35, distance information indicating a distance from electric bicycle 3. The distance information is an example of the operation information.

Moreover, the torque sensor may be a sensor that detects human power driving force generated by the crank shaft rotating in accordance with human power driving force applied to pedals 17. The torque sensor transmits torque information indicating torque of crank shaft of electric bicycle 3 to control device 5 via communication unit 35. The torque information is an example of the operation information.

Furthermore, the geomagnetic sensor may be a sensor that detects an orientation of geomagnetism, and calculates directions such as X axis, Y axis, and Z axis using values on the three orthogonal axes, for example. The geomagnetic sensor transmits geomagnetic information indicating geomagnetism at a location of electric bicycle 3 to control device 5 via communication unit 35. The geomagnetic information is an example of the operation information.

Moreover, the GPS device may be a device that detects a current location of electric bicycle 3. The GPS device transmits location information indicating a current location of electric bicycle 3 to control device 5 via communication unit 35.

Note that the detection method is not limited, because the acceleration information, braking information, steering angle information, speed information, vibration information, angular velocity information, distance information, torque information, geomagnetic information, location information, etc. may be obtained using sensors such as an acceleration sensor, a brake sensor, a steering angle sensor, a speed sensor, a vibration sensor, a distance sensor, a torque sensor, a geomagnetic sensor, and a GPS device.

Detection device 31 may be disposed at any position on electric bicycle 3. In other words, detection device 31 may be disposed on the front, middle, or rear portion of electric bicycle 3, for example. Here, the front, middle, and rear portions are defined relative to the direction of forward travel. In the present embodiment, detection device 31 is disposed on the front portion of electric bicycle 3, for example, on a headlight.

Communication unit 35 is a communication module that transmits, to control device 5, the operation information detected by detection device 31 and location information corresponding to the operation information. The location information is implemented using the GPS function included in electric bicycle 3.

The location information corresponds to the operation information. In other words, the location information is associated with each operation of electric bicycle 3 indicated in the operation information. The association may be performed using the time information indicated in the operation information and the time information indicated in the location information. The location information is three-dimensional location information represented by xyz coordinates. Note that the location information may be two-dimensional location information represented by xy coordinates.

Control device 5 includes obtaining unit 51, calculation unit 53, storage unit 55, and transmission unit 57.

Obtaining unit 51 is, for example, a communication module capable of connecting to a network. Obtaining unit 51 obtains the location information of electric bicycle 3 and the operation information obtained by electric bicycle 3. More specifically, obtaining unit 51 obtains, via a network, the location information indicating the location of electric bicycle 3 and the operation information obtained by electric bicycle 3. Obtaining unit 51 outputs the location information to storage unit 55 and outputs the operation information to calculation unit 53.

Note that obtaining unit 51 may be detection device 31. In other words, control device 5 may be equipped with detection device 31.

Calculation unit 53 generates environment information indicating an estimated travel environment of electric bicycle 3 based on the operation information.

The operation information and the environment information will be described.

The operation information is at least one of the acceleration information, braking information, steering angle information, speed information, vibration information, angular velocity information, distance information, torque information, geomagnetic information, and location information, etc., as described above.

For example, using the acceleration information makes it possible to estimate that a road has an uneven surface or is congested with persons, etc. For example, when electric bicycle 3 travels normally and enters a road having an uneven surface or an area congested with persons, etc., the acceleration during travel is considered to be reduced. Calculation unit 53 can estimate the degree of congestion around electric bicycle 3 based on whether the acceleration is greater than or equal to a predetermined threshold.

Note that combining the acceleration information and the braking information enables estimation of the length of a slope, etc. For example, when the acceleration increases, electric bicycle 3 is considered to enter a downslope and go down. When the acceleration decreases, electric bicycle 3 is considered to enter an upslope and go up. When electric bicycle 3 enters a downslope, the travel speed increases, and thus the brakes are considered to be applied. When the application of the brakes is ended, electric bicycle 3 is considered to have passed the downslope. Moreover, when electric bicycle 3 enters a downslope, the acceleration decreases, and thus the brakes are considered not to be applied. When the acceleration of electric bicycle 3 increases, electric bicycle 3 is considered to have passed the upslope.

For example, using the braking information makes it possible to estimate whether a person is present around electric bicycle 3, etc. For example, it is considered that the brakes are applied in an area where a movable body such as a pedestrian or a motorcycle, is present around electric bicycle 3. When the number of applying the brakes is large on a sidewalk without a signal, it is considered the sidewalk is congested with persons. Calculation unit 53 can estimate the degree of congestion around electric bicycle 3 based on whether the number of applying the brakes is greater than or equal to a predetermined threshold.

For example, using the steering angle information makes it possible to estimate whether the road is icy, partially damaged, and so on. If the road is icy or damaged, etc., a user would take a detour around such a part. For example, when calculation unit 53 detects electric bicycle 3 taking a detour around a particular part based on the steering angle information, calculation unit 53 can estimate that the road is icy or damaged, etc., based on a change in the steering angle information, for example, change that can be observed when electric bicycle 3 takes a detour around a particular part.

For example, it is possible to estimate the degree of congestion with movable bodies such as pedestrians or motorcycles around electric bicycle 3 using the speed information on the roads where electric bicycle 3 travels. When the travel speed decreases compared with the travel speed of electric bicycle 3 on other roads, the area around electric bicycle 3 is estimated to be congested with movable bodies. When the travel speed increases compared with the travel speed of electric bicycle 3 on other roads, it is considered that there are no or a few movable bodies around electric bicycle 3. Calculation unit 53 can estimate the degree of congestion around electric bicycle 3 based on whether the travel speed is greater than or equal to a predetermined threshold.

Note that, combining the speed information and the braking information increases the accuracy of the degree of congestion. In other words, when the travel speed decreases and the number of applying brakes increases compared with the travel speed and the number of applying brakes on other roads, the area around electric bicycle 3 is considered to be congested with movable bodies. When the travel speed increases and the number of applying brakes decreases compared with those on other roads, no or a few movable bodies are considered to be present around electric bicycle 3.

For example, using the vibration information makes it possible to estimate that a road where electric bicycle 3 travels has a difference in level, such as an uneven surface, and so on. Calculation unit 53 can estimate that a road is partially damaged or unpaved when the vibration indicated by the vibration information is greater than or equal to a threshold.

For example, using the angular velocity information makes it possible to estimate that the road where electric bicycle 3 travels is a slope. Calculation unit 53 estimates that the road is a steep slope when the angular velocity indicated by the angular velocity information is greater than or equal to a predetermined threshold. Calculation unit 53 estimates that the road is a gentle slope when the angular velocity is less than the predetermined threshold.

For example, using the distance information makes it possible to estimate that an object such as a person is present around electric bicycle 3. Calculation unit 53 can estimate that an object such as a person is present near electric bicycle 3 when the distance indicated by the distance information is less than or equal to a predetermined threshold.

For example, using the torque information makes it possible to estimate the degree of congestion around electric bicycle 3 in a similar manner as in the above description of the speed information.

For example, using the geomagnetic information makes it possible to estimate that the road where electric bicycle 3 travels is a slope. A tilt of electric bicycle 3 with respect to a horizontal plane can be estimated based on the direction of forward travel of electric bicycle 3 indicated by the geomagnetic information. Calculation unit 53 can estimate, based on the tilt, a gradient of a slope or whether the road is an upslope or downslope, for example.

For example, using the location information makes it possible to estimate the degree of congestion around electric bicycle 3. More specifically, when control device 5 obtains a plurality items of location information around a particular location in a predetermined period of time, the area around electric bicycle 3 is considered to be congested. In other words, calculation unit 53 can estimate the degree of congestion around electric bicycle 3 based on the congestion situation of the communication traffic between electric bicycle 3 and control device 5.

The operation information, environment information, location information, and time information are described with specific examples.

Figure 3A:
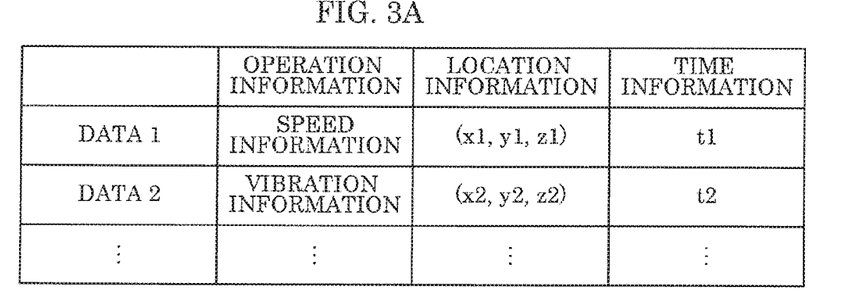
FIG. 3A is a table showing an example of operation information, location information, and time information.
Figure 3B:
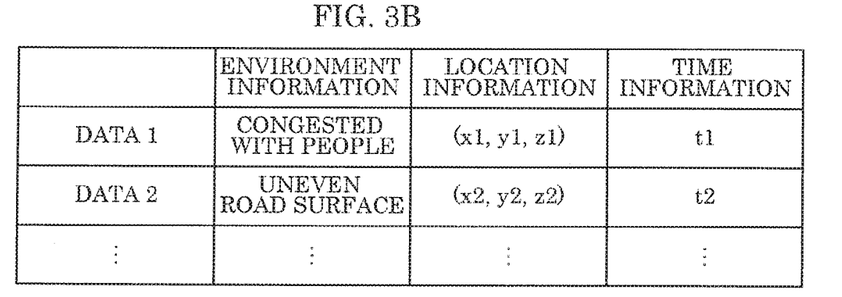
FIG. 3B is a table showing an example of environment information, location information, and time information.

FIG. 3A is a table showing an example of operation information, location information, and time information. FIG. 3B is a table showing an example of environment information, location information, and time information.

As shown in FIG. 3A, data 1 obtained by obtaining unit 51 includes speed information as the operation information. In data 1, the speed information is detected at a location ($x1$, $y1$, $z1$). Time information corresponding to these items of information is $t1$. Furthermore, data 2 obtained by obtaining unit 51 includes vibration information as the operation information. In data 2, the vibration information is detected at a location ($x2$, $y2$, $z2$). Time information corresponding to these items of information is $t2$.

Calculation unit 53 generates environment information as shown in FIG. 3B using the data items in FIG. 3A, while maintaining the association between the location information and the time information.

Accordingly, the environment information is information indicating an estimation about a degree of congestion with movable bodies such as persons, vehicles, etc.; an icy road condition; an uneven road surface condition; a gradient of a slope, and so on.

Note that in the above description, a degree of congestion with movable bodies such as persons, vehicles, and other objects; an icy road condition; an uneven road surface condition; and a gradient of a slope are estimated using the acceleration information, the braking information, the steering angle information, the speed information, the vibration information, the angular velocity information, the distance information, the torque information, the geomagnetic information, the location information, etc. However, these are mere examples and not limited to the above items of information. Moreover, the accuracy of the environment information may be increased by any combination of the above items of information.

Calculation unit 53 generates environment information using a table of environment information corresponding to the operation information. Accordingly, the location information is associated with the environment information. In other words, the environment information inherits the location information associated with the operation information.

Figure 4:
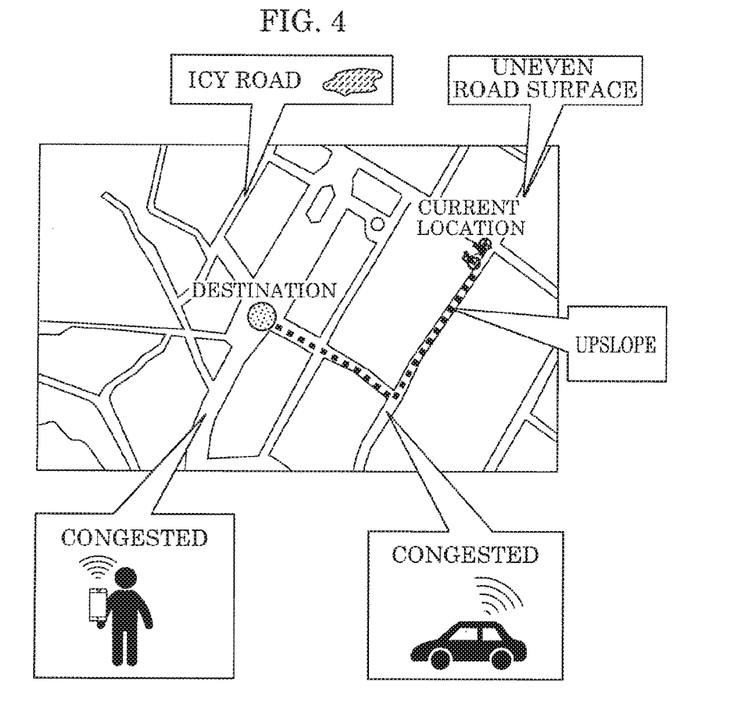
FIG. 4 is a schematic diagram illustrating an example of an updated map that has been generated.

Calculation unit 53 generates an updated map illustrated in FIG. 4 by associating the location information with the environment information, and reflecting these items of information on a map. FIG. 4 is a schematic diagram illustrating an example of a generated updated map.

More specifically, calculation unit 53 obtains map information stored in another server; represents, using xyz coordinates, information shown on a previous map which is a map before being updated; and reflects the environment information associated with the location information obtained by obtaining unit 51 at a location corresponding to the location on the previous map. Moreover, calculation unit 53 generates an updated map as illustrated in FIG. 4 and transmits the generated updated map to terminal device 70, etc. via transmission unit 57, at every predetermined period of time. Note that in the present embodiment, map information is obtained from another server. However, the map information may be stored in storage unit 55.

As illustrated in FIG. 1, storage unit 55 is a device that stores the location information, the environment information, and a table of the environment information corresponding to the operation information. Moreover, storage unit 55 may store map information about a previous map and/or store an updated map. Storage unit 55 may be a memory such as a random access memory (RAM), or a storage such as a hard disc drive and a solid state drive.

Transmission unit 57 transmits the generated updated map to terminal device 70 via a network. Transmission unit 57 is, for example, a communication module capable of connecting to a network and transmitting information.

Such map generation system 1 provides the generated updated map to terminal device 70. Terminal device 70 is, for example, a tablet, a smart phone, or a personal computer. Terminal device 70 is an example of external device.

Terminal device 70 includes display unit 71 that displays the updated map and communication unit 73 that receives the updated map.

Display unit 71 is a display, such as a liquid crystal display panel. Display unit 71 displays, via communication unit 73, the updated map received from control device 5. Communication unit 73 is, for example, a communication module capable of receiving an updated map from control device 5 via a network.

Note that terminal device 70 may include a route selection unit that selects a route from a current location to a user's destination. As shown by the bold dashed line in FIG. 4, upon receipt of an updated map, the route selection unit may reflect the route from the current location to the user's destination on the received updated map, and display the updated map showing the route on display unit 71. For example, when there is an area congested with movable bodies, or a damaged road, etc. on the route from the current location to the user's destination, the route selection unit may select a detour for avoiding these and reflect the selected detour on the updated map. The route selection unit may be included in control device 5, and is not limited to be included in terminal device 70.

Moreover, terminal device 70 may guide a route using a voice guide, and display operation information using a caption displayed on a location on the map in FIG. 4, or change the caption to be displayed on the map depending on a time period.

Note that in the present embodiment, detection device 31 is provided to electric bicycle 3, but may be provided to terminal device 70. In other words, the above operation information may be obtained by a user who has terminal device 70 or by electric bicycle 3 equipped with terminal device 70.

Operations

Figure 5:
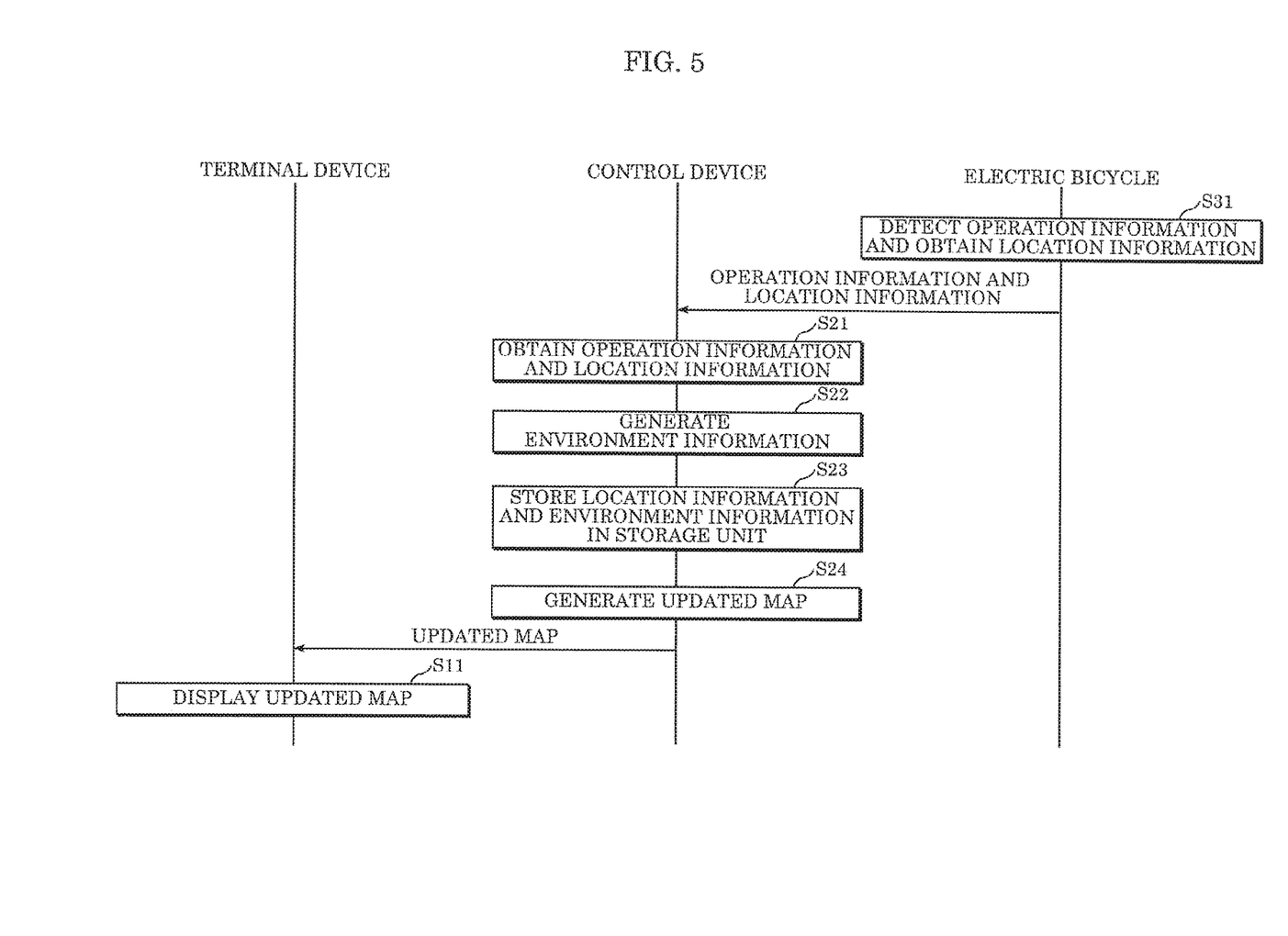
FIG. 5 is a sequence diagram illustrating an operation of the map generation system according to the embodiment.

FIG. 5 is a sequence diagram illustrating operations of map generation system 1 according to the embodiment.

Here, a situation is assumed in which a user travels on a road by electric bicycle 3.

As shown in FIG. 5, first, detection device 31 detects operation information when electric bicycle 3 travels (S31). Moreover, electric bicycle 3 obtains location information that indicates its location (S31). For example, time information is added to the operation information and the location information, and the operation information is associated with the location information. Electric bicycle 3 transmits the operation information and the location information to control device 5.

Next, calculation unit 53 receives the operation information and the location information (S21). Step S21 is an example of a step of obtaining the operation information.

Next, calculation unit 53 generates environment information indicating an estimated travel environment of electric bicycle 3, based on the operation information (S22). Step S22 is an example of a step of generating environment information.

Next, calculation unit 53 stores the location information and the environment information in storage unit 55 (S23). Step S23 is an example of a step of storing the location information and the environment information.

Next, calculation unit 53 generates an updated map by associating the location information with the environment information, and reflecting the location information and the environment information on the map (S24). Calculation unit 53 transmits the generated updated map to terminal device 70 via transmission unit 57. Step S24 is an example of a step of generating an updated map.

Next, when terminal device 70 receives the updated map from control device 5, terminal device 70 displays the updated map on display unit 71 (S11). This process ends here.

Working Effects

Next, working effects of control device 5 and a map generation method according to the present embodiment will be described.

As described above, control device 5 according to the present embodiment includes: obtaining unit 51 configured to obtain location information of electric bicycle 3 and operation information obtained by electric bicycle 3; calculation unit 53 configured to generate environment information indicating an estimated travel environment of electric bicycle 3 based on the operation information; and storage unit 55 configured to store the location information and the environment information. Furthermore, calculation unit 53 is configured to generate an updated map by associating the location information with the environment information, and reflecting the location information and the environment information of information on the map.

With this, calculation unit 53 generates environment information in which a travel environment of electric bicycle 3 is estimated based on the operation information. This makes it possible to estimate the travel environment by embodying the operation information obtained during travel of electric bicycle 3. This enables calculation unit 53 to generate an updated map by associating the location information with the environment information, and reflect the location information with the environment information on the map.

Thus, control device 5 can generate a map that accurately reflects information.

Moreover, the map generation method according to the present embodiment includes: obtaining location information of electric bicycle 3 and operation information obtained by electric bicycle 3; generating environment information indicating an estimated travel environment of electric bicycle 3 based on the operation information; and storing the location information and the environment information; and generating an updated map by associating the location information with the environment information, and reflecting the location information and the environment information on a map.

This method also has similar or the same working effects described above.

Moreover, in control device 5 according to the present embodiment, the operation information includes information indicating the operation of electric bicycle 3 during travel of electric bicycle 3. The information is at least one of acceleration information, braking information, steering angle information, speed information, vibration information, angular velocity information, distance information, torque information, geomagnetic information, and GPS information.

Accordingly environment information indicating an accurately estimated travel environment of electric bicycle 3 can be generated, because the operation information includes at least one of acceleration information, braking information, steering angle information, speed information, vibration information, angular velocity information, distance information, torque information, geomagnetic information, and GPS information.

Moreover, control device 5 according to the present embodiment further includes transmission unit 57 configured to transmit an updated map to terminal device 70.

With this structure, the updated map generated by control device 5 is transmitted to terminal device 70, and terminal device 70 can display the updated map on display unit 71. Furthermore, transmitting the updated map to terminal device 70 reduces the processing load on terminal device 70 compared with generating an updated map by terminal device 70.

For example, when a user views the updated map, the user can select an appropriate route by taking a detour when the user recognizes part of a road that needs to be repaired or knows the degree of congestion, based on a variety of information shown on the updated map.

OTHER VARIATIONS, ETC

Although the present disclosure has been described based on the embodiment, the present disclosure is not limited to the above-described control device and map generation method.

For example, the control device according to the above embodiment may be provided to a server device, a vehicle, or a terminal device.

Moreover, in the control device and the map generation method according to the above embodiment, the calculation unit can estimate not only the degree of congestion on the road using the operation information obtained from the detection device, but also estimate a travel environment of the electric bicycle using operation information obtained from sensors such as roadside units provided along the road.

Moreover, in the control device and map generation method according to the above embodiment, the calculation unit does not need to reflect, on the map, environment information that has been stored for at least a predetermined number of days as of a current time. In other words, the calculation unit may delete, from the updated map, old environment information that has been stored for at least a predetermined number of days as of the current time. With this, the calculation unit can prevent further increase in data amount of the updated map.

Moreover, the map generation method according to the above embodiment may be a program that may be implemented using a computer.

Moreover, each processing unit included in the control device according to the above embodiment may be typically implemented as a large-scale integration (LSI) circuit, which is an integrated circuit. The processing units may be individually configured as single chips or may be configured so that part or all of the processing units are included in a single chip.

Moreover, integration is not limited to LSI and may be implemented with a specialized circuit or a general purpose processor. A field-programmable gate array (FPGA) which allows programming after LSI manufacturing or a reconfigurable processor which allows reconfiguration of the connections and settings of the circuit cells inside the LSI may also be used.

Moreover, in the above embodiment, each structural element may be configured as dedicated hardware or implemented by executing a software program suitable for the structural elements. Each structural element may be implemented as a result of a program execution unit of a central processing unit (CPU) or processor or the like reading and executing a software program stored on a storage medium such as a hard disk or semiconductor memory.

Furthermore, the numerical figures used in the foregoing embodiment are all provided as examples for describing the present disclosure, and the present disclosure is not limited to these numerical figures.

Furthermore, the partitioning of function blocks in the block diagrams in the foregoing embodiment is an example, and multiple function blocks may be integrated into a single function block, a single function block may be divided into plural blocks, and part of a function may be transferred to another function block. In addition, the functions of plural function blocks having similar functions may be processed by a single hardware or software through parallel processing or time division.

Also, the processing order of executing the steps shown in the flowcharts is a mere illustration for specifically describing the present disclosure, and thus may be an order other than the shown order. Furthermore, one or more of the steps may be executed simultaneously (in parallel) with another step.

The scope of the present disclosure may also include embodiments as a result of adding various modifications to the embodiment that may be conceived by those skilled in the art, or embodiments obtained by combining the structural elements and functions in the embodiment in any manner as long as the combination does not depart from the scope of the present disclosure.

The invention claimed is:

1. A control device, comprising:
   circuitry configured to perform as:
   an obtaining unit configured to obtain location information of a vehicle, operation information obtained by the vehicle, and time information corresponding to the location information and the operation information, the operation information being associated with the location information using the time information; and
   a calculation unit configured to generate environment information indicating an estimated travel environment of the vehicle based on the operation information; and
   storage configured to store the location information, the environment information, and the time information corresponding to the location information, wherein
   the calculation unit is configured to update a map by
      associating the location information with the environment information using the time information corresponding to the location information, and
      reflecting the location information and the environment information on the map, wherein:
   the operation information is braking information obtained by the vehicle,
   the environment information is a degree of congestion around the vehicle, and is generated at the vehicle, and the calculation unit is configured to estimate the degree of congestion based on whether a number of brake operations performed by the vehicle is equal to or greater than a threshold value.

2. The control device according to claim 1, wherein the operation information includes information indicating an operation of the vehicle during travel of the vehicle, the information being at least one of acceleration information, braking information, steering angle information, speed information, vibration information, angular velocity information, distance information, torque information, geomagnetic information, and global positioning system (GPS) information.

3. The control device according to claim 1, wherein the circuitry is further configured to perform controlling of transmitting the updated map to an external device.

4. A map generation method, comprising:
  obtaining location information of a vehicle, operation information obtained by the vehicle, and time information corresponding to the location information and the operation information, the operation information being associated with the location information using the time information;
  generating environment information indicating an estimated travel environment of the vehicle based on the operation information; and
  storing the location information, the environment information, and the time information corresponding to the location information; and
  updating a map by
    associating the location information with the environment information using the time information of the location information, and
    reflecting the location information and the environment information on the map, wherein:
  the operation information is braking information obtained by the vehicle,
  the environment information is a degree of congestion around the vehicle, and is generated at the vehicle, and
  the generating includes estimating the degree of congestion based on whether a number of brake operations performed by the vehicle is equal to or greater than a threshold value.

* * * * *